3,698,886
1-(3 - TRIFLUOROMETHYLPHENYL) - 4,6-DIISO-
PROPYL - 3,5 - DIMETHYLHEXAHYDRO-1,3,5-
TRIAZIN-2-ONE AS A HERBICIDE
John Paul Chupp, Kirkwood, Mo., assignor to Monsanto
Company, St. Louis, Mo.
No Drawing. Filed June 4, 1968, Ser. No. 734,217
The portion of the term of the patent subsequent to
Aug. 25, 1987, has been disclaimed
Int. Cl. A01n 9/22; C07d 55/50
U.S. Cl. 71—93         7 Claims

ABSTRACT OF THE DISCLOSURE 1-(3-tirfluoromethylphenyl)-4,6 - diisopropyl - 3,5 - di-methyl-hexahydro - 1,3,5 - triazin-2-one, the preparation thereof and the phytocidal use thereof.

---

This invention relates to a new and useful compound, specifically 1-(3-trifluoromethyl phenyl)-4,6-diisopropyl-3,5-dimethyl-hexahydro-1,3,5-triazin-2-one of the general formula

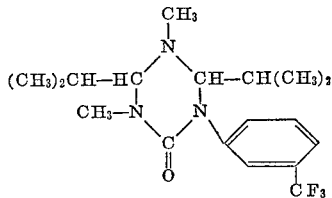

which compound can be alternatively termed 1-(3-trifluoromethylphenyl) - 4,6-diisopropyl-3,5-dimethyl-tetrahydro-s-triazin-2(1H)-one.

This compound is readily prepared by bringing together and reacting substantially one mole of 3-trifluoromethylphenyl isocyanate and substantially two moles of N-isobutylidene-N-methylimine, which is the Schiff base

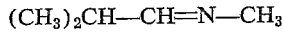

obtained from equal moles of methylamine and isobutyraldehyde. The reaction temperature employed will be in the range above the freezing point of the reaction system up to about the decomposition temperature of the end product but preferably in a fluid system in the range of from about 10° C. to about 50° C. The reaction is preferably conducted in the presence of an inert organic liquid such as benzene, toluene, xylene, chlorobenzene, tetrachloroethane, carbon tetrachloride, and the like, or mixtures thereof.

As illustrative of the preparation of these compounds but not limitative thereof is the following:

EXAMPLE

To a suitable reaction vessel equipped with a thermometer and agitator is charged 8.5 parts by weight of N-isobutylidene-N-methylimine and approximately 50 parts by weight of benzene. While agitating the so charged mass 9.4 parts by weight of 3-trifluoromethylphenyl isocyanate is slowly added while maintaining the temperature below about 32° C. The reaction mass is then agitated at room temperature for about three hours, and thereafter the reaction mass is distilled at 50° C. at 5 mm. of mercury to remove the benzene and other volatiles. The viscous glass-like residue is 1-(3-trifluoromethylphenyl)-4,6-diisopropyl-3,5-dimethyl-hexahydro-1,3,5-triazine-2-one.

In the process of this invention the methods by which the compound of this invention are isolated can vary in accordance with well known procedures therefor. For example, purification if such be deemed necessary by solvent extraction or by absorptive agents such as activated carbon can precede the removal of the inert organic solvent when the latter is employed in the reaction system. Additionally an inert organic solvent can be added to the reaction product along with the absorptive agent or agents for purification purposes. However, in general the reaction product even in the crude state is generally satisfactory for phytotoxicidal purposes without further purification.

The compound of this invention is phytotoxic to a wide variety of plant life in the pre-emergent state and in particular in the post-emergent state. This compound is particularly effective against growing broad leaf plants. It is particularly outstanding in the control of annual weeds in growing corn at relatively low application rates.

As illustrative of the contact or post-emergent phytotoxicity of the compound of this invention is the following:

(A) 1 - (3 - trifluoromethylphenyl) - 4,6-diisopropyl-3,5-dimethyl-hexahydro-1,3,5-triazin-2-one and 1-(3-chlorophenyl)-3,5-dimethyl-hexahydro-1,3,5-triazin-2-one, an amber viscous oil, respectively, were applied as aqueous sprays at a concentration of 0.5 percent by weight at a rate of 10 pounds of active ingredient per acre to separate plots both having 14 day established growth of morning glory, wild oat, brome grass, rye grass, radish, sugar beet, foxtail, crab grass, pigweed, soybean, wild buckwheat, sorghum and tomato. An inspection of the respective plots conducted fourteen days after the application revealed the following tabulated results wherein the relative value of each compound with respect to its phytocidal effect on the various growing plants is indicated by a number as follows:

0 _____ No phytotoxicity.
1 _____ Slight phytotoxicity.
2 _____ Moderate phytotoxicity.
3 _____ Severe phytotoxicity.
4 _____ Plant dead.

EXTENT OF PHYTOTOXICITY

| Compound | 1-(3-trifluoro-methylphenyl)-4,6-diisopropyl-3,5-dimethyl-hexahydro-1,3,5-triazin-2-one | 1-(3-chloro-phenyl)-3,5-dimethyl-hexahydro-1,3,5-triazin-2-one |
|---|---|---|
| Plant: | | |
| Broad leaf plants: | | |
| Morning glory | 4 | 1 |
| Radish | 4 | 1 |
| Sugar beet | 4 | 2 |
| Pigweed | 4 | 1 |
| Soybean | 2 | 1 |
| Wild buckwheat | 4 | 3 |
| Tomato | 4 | 1 |
| Sorghum | 2 | 0 |
| Grass or narrow leaf plants: | | |
| Wild oat | 3 | 0 |
| Brome grass | 3 | 1 |
| Rye grass | 3 | 0 |
| Foxtail | 4 | 1 |
| Crab grass | 3 | 1 |
| Control [1] | 0 | 0 |

[1] No active ingredient.

As aforementioned the compound of this invention is particularly outstanding at relatively low application rates in the control of annual weeds, particularly broad leaf weeds, in growing corn. As illustrative of such the compound of this invention was applied as an aqueous spray at a concentration of 0.2 percent by weight at a rate of 4 pounds per acre to separate plots both having 21 day established growth, respectively, of corn (*Zea mays*) and a wide variety of grasses and broad leaf plants below itemized. An inspection of the plots conducted fourteen days after the application revealed the following tabulated results wherein the relative value of the compound of this invention with respect to its phytocidal effect on the below itemized growing plants is indicated by a number as follows:

| | |
|---|---|
| 0 | No phytotoxicity. |
| 1 | Slight phytotoxicity. |
| 2 | Moderate phytotoxicity. |
| 3 | Severe phytotoxicity. |
| 4 | Plant dead. |

EXTENT OF PHYTOTOXICITY

| Plant: | Compound of this invention |
|---|---|
| Corn | 0 |
| Broad leaf weeds: | |
| Cocklebur | 3 |
| Lamb's-quarter | 4 |
| Coffeeweed | 4 |
| Pigweed | 4 |
| Velvet leaf | 4 |
| Smartweed | 4 |
| Broad leaf crops: | |
| Soybean | 3 |
| Sugar beet | 4 |
| Grasses or narrow leaf plants: | |
| Wild oat | 3 |
| Brome grass | 4 |
| Barnyard grass | 4 |
| Wheat | 4 |
| Crab grass | 3 |
| Control [1] | 0 |

[1] No active ingredient.

As illustrative of the pre-emergent phytotoxicity of the compound of this invention it was sprayed in the form of an emulsion thereof at the rate of 5 pounds thereof per acre to the soil surface of separate plots both seeded with tomato, sugar beet, pigweed, wild buckwheat, and crab grass. Fourteen days later in the greenhouse under ordinary conditions of sunlight and watering, the compound of this invention displayed very pronounced (or severe) suppression of each of said five species of plant life.

From the foregoing evaluation data it is apparent that the compound of this invention is an effective phytotoxicide particularly as a contact phytotoxicide. Valuable selective post-emergent phytotoxicidal effects will be observed by applications of small amounts, for example, as low as 0.1 lb. of the compound of this invention per acre as well as higher concentrations, for example, up to 15 lbs. per acre. The preferred range of application for post-emergent specificity in growing corn is from about 1 to about 10 lbs. per acre. For general application and phytotoxicidal effect on both grasses and broad leaf plants in either the pre-emergent or post-emergent larger state amounts, e.g. from about 15 to about 30 lbs. per acre, will be found necessary.

It will be apparent that different effects can be obtained by modifying the method of use. For this reason an essential part of this invention is the formulation so as to permit a uniform predetermined application of the new phytotoxicide to growing plants or soil or other growth media so as to produce the desired effect. By proper selection and proportioning of the various conditioning agents either liquid or solid formulations can be prepared, and so as to adapt the new phytotoxicide for achieving the desired result with any conventional device for treating growing plants or the surface or sub-surface of the soil or other growth media.

Although the compound of this invention is useful per se in controlling a wide variety of plant growth in the pre-emergent or post-emergent state, it is preferable that it be supplied to the plant growing medium or growing plant in a dispersed form in a suitable extending agent.

In the instant specification and appended claims it is to be understood that the term "dispersed" is used in its widest possible sense. When it is said that the compound of this invention is dispersed, it means that the particles of it can be molecular in size and held in true solution in a suitable organic solvent. It means further that the particles can be colloidal in size and distributed throughout a liquid phase in the form of suspensions or emulsions or in the form of particles held in suspension by wetting agent. The term "dispersed" also means that the particles can be mixed with and distributed throughout a solid carrier providing a mixture in particulate form e.g. pellets, granules, powders, or dusts.

The exact concentration of the compound of this invention employed in combatting or controlling noxious vegetation can vary considerably provided the required dosage (i.e. phytotoxic amount) thereof is supplied to the growing plant or plant growing medium. From a practical point of view, the manufacturer must supply the agriculturist with a low-cost concentrate or spray base or particulate solid base in such form that, by merely mixing with water or solid extender (e.g. powdered clay or talc) or other low-cost material available to the agriculturist at the point of use, he will have an easily prepared phytotoxicidal spray or particulate solid. In such a concentrate composition, the compound of this invention generally will be present in a concentration of 5 to 95 percent by weight, the residue being any one or more of the well-known phytotoxicidal adjuvants, such as the various surface active agents (e.g. detergents, a soap or other emulsifying or wetting agent), surface active clays, solvents, diluents, carrier media, adhesives, spreading agents, humectants, and the like.

There are a large number of organic liquids which can be used for the preparation of solutions, suspensions or emulsions of the compound of this invention. For example, isopropyl ether, acetone, methyl ethyl ketone, dioxane, cyclohexanone, carbon tetrachloride, ethylene dichloride, tetrachloroethane, hexane, heptane and like higher liquid alkanes, hydrogenated naphthalenes, solvent naphtha, benzene, toluene, xylene, petroleum fractions (e.g. those boiling almost entirely under 400° F. and having a flash point above about 80° F., particularly kerosene), mineral oils and the like.

The compound of this invention is preferably applied to growing plants or the plant growing medium in the form of emulsions or suspensions. Emulsions or suspensions are prepared by dispersing the compound of this invention either per se or in the form of an organic solution thereof in water with the aid of a water-soluble surfactant. The term "surfactant" as employed here and in the appended claims is used as in Volume II of Schwartz, Perry and Berch's "Surface Active Agents and Detergents" (1958, Interscience Publishers, Inc., New York) in place of the expression "emulsifying agent," to connote generically the various "emulsifying agents," "dispersing agents," "wetting agents" and "spreading agents" that are adapted to be admixed with the active compounds of this invention in order to secure better wetting and spreading of the new active ingredient in the water vehicle or carrier in which it is insoluble through lowering the surface tension of the water (see also Frear "Chemistry of Insecticides, Fungicides and Herbicides," second edition, 1948, page 280). These surfactants include the well-known capillary active substances which may be anion-active (or anionic), cation-active (or cationic), or non-ionizing (or non-ionic) which are described in detail in Volumes I and II of Schwartz, Perry and Berch's "Surface Active Agents and Detergents" (1958, Interscience Publishers, Inc., New York) and also in the November 1947 issue of Chemical Industries (pages 811–824) in an article entitled "Synthetic Detergents" by John W. McCutcheon and also in the July, August, September, and October 1952 issues of Soap and Sanitary Chemicals under the title "Synthetic Detergents." The disclosures of these articles with respect to surfactants, i.e. the anion-active, cation-active and non-ionizing capillary active substances are incorporated in this specification by reference in order to avoid unnecessary enlargement of this specification. The preferred surfactants are the water-soluble non-ionic surface-active agents set forth in U.S. 2,846,398 (issued Aug. 4, 1958).

The compound of this invention can be dispersed by suitable methods (e.g. tumbling or grinding) in solid extending agents either of organic or inorganic nature and applied to growing plants or plant growing medium in particulate form. Such solid materials include for example, tricalcium phosphate, calcium carbonate, kaoline, bole, kieselguhr, talc, bentonite, fuller's earth, pyrophillite, diatomaceous earth, calcined magnesia, volcanic ash, sulfur and the like inorganic solid materials and include for example, such materials of organic nature as powdered cork, powdered wood, and powdered walnut shells. The preferred solid carriers are the adsorbent clays, e.g. attapulgus clay. These mixtures can be used for phytotoxicidal purposes in the dry form or by addition of water-soluble surfactants or wetting agents the dry particulate solids can be rendered wettable by water so as to obtain stable aqueous dispersions or suspensions suitable for use as sprays.

In all of the forms described above the dispersions can be provided ready for use in combatting noxious vegetation or they can be provided in a concentrated form suitable for mixing with or dispersing in other extending agents. As illustrative of a particularly useful concentrate is an intimate mixture of the compound of this invention with a water-soluble non-ionic surfactant which lowers the surface tension of water in the weight proportions of 0.1 to 15 parts of surfactant with sufficient of the compound of this invention to make 100 parts by weight. Such a concentrate is particularly adapted to be made into a spray for combatting various forms of noxious vegetation by the addition of water thereto. As illustrative of such a concentrate is an intimate mixture of 95 parts by weight of 1 - (3-trifluoromethylphenyl)-4,6-diisopropyl-3,5 - dimethyl - hexahydro - 1,3,5 - triazin - 2 - one and 5 parts by weight of a water-soluble non-ionic surfactant such as polyoxyethylene derivative of sorbitan monolaurate.

Another useful concentrate adapted to be made into a spray for combatting noxious vegetation is a solution (preferably as concentrated as possible) of the compound of this invention in an organic solvent therefor. The said liquid concentrate preferably contains dissolved therein a minor amount (e.g. 0.5 to 10 percent by weight of the weight of the new phytotoxicidal agent) of a surfactant (or emulsifying agent), which surfactant is water-soluble. As illustrative of such a concentrate is a solution of 1-(3-trifluoromethylphenyl) - 4,6 - diisopropyl - 3,5 - dimethyl-hexahydro-triazin-2-one in acetone which solution contains dissolved therein a water-soluble non-ionic surfactant.

Of the surfactants aforementioned in preparing the various emulsifiable, wettable or dispersible compositions or concentrates of this invention, the non-ionic surfactants are preferred. Of the non-ionic surfactants the particularly preferred are the water-soluble polyoxyethylene derivatives of alkylphenols (particularly isooctylphenol) and the water-soluble polyoxyethylene derivatives of the mono-higher fatty acid esters of sorbitan respectively containing 15 to 30 moles of ethylene oxide per mole of sorbitan mono-ester or alkylphenol.

The compound of this invention can also be advantageously employed in combination with other pesticides, including, for example, fungicides, nematocides, bactericides, and insecticides. In this manner it is possible to obtain mixtures which are effective against a wide variety of pests and other forms of noxious life.

While this invention has been described with respect to certain embodiments, it is to be understood that it is not so limited and that variations and modifications thereof obvious to those skilled in the art can be made without departing from the spirit and scope thereof.

1-(3-chlorophenyl) - 3,5 - dimethyl-hexahydro-1,3,5-triazin - 2 - one described herein for comparative purposes is prepared in accordance with the procedure described in Belgium Pat. 627,746.

The embodiments of the invention in which an exclusive property or privilege is claimed are defined as follows:

1. A method for controlling growing noxious vegetation which comprises applying thereto a phytotoxic amount of the compound of the structure:

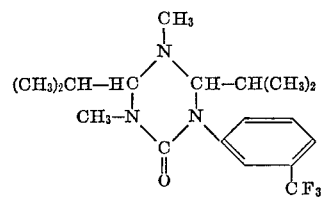

2. A method in accordance with claim 1 wherein the phytotoxic amount applied is in the range of from about 0.1 pound to about 30 pounds per acre.

3. A method for controlling growing noxious vegetation according to claim 1 wherein said noxious vegetation is weed infestations in growing corn which comprises applying to said weed infested corn the compound at a rate of from about 1 pound to about 10 pounds per acre.

4. A method of pre-emergently inhibiting the growth of plants which comprises treating the plant growing medium with a quantity at least sufficient to inhibit the pre-emergent growth of plants contained in the plant growing medium of the compound of the structure:

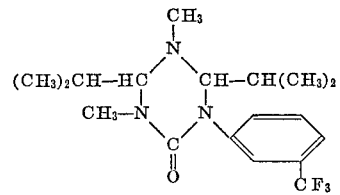

5. A phytocidal composition comprising the compound of the structure:

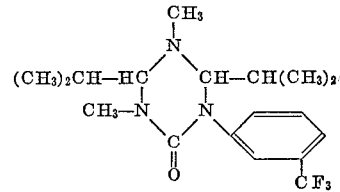

dispersed in an extending agent selected from the group consisting of liquid and solid extending agents.

6. A phytocidal composition according to claim 5 wherein said composition is a concentrate comprising on a weight basis 0.1 to 15 parts of a water-soluble non-ionic surfactant and sufficient of the compound of claim 5 to make 100 parts by weight.

7. A phytocidal concentrate according to claim 5 comprising said compound dispersed in an organic solvent therefor and having dissolved therein a minor amount of a water-soluble non-ionic surfactant.

References Cited

UNITED STATES PATENTS

| | | | |
|---|---|---|---|
| 3,505,057 | 4/1970 | Luckenbaugh | 71—93 |
| 3,505,324 | 4/1970 | Chupp | 260—248 |
| 3,525,789 | 8/1970 | Chupp | 71—93 |
| 3,235,358 | 2/1966 | Soboczenski | 71—92 |
| 3,244,504 | 4/1966 | Martin et al. | 71—120 |

FOREIGN PATENTS

| | | | |
|---|---|---|---|
| 966,283 | 8/1964 | Great Britain | 71—93 |

OTHER REFERENCES

Raleigh, cited in Chem. Abst. 64, 18329 (1966).

LEWIS GOTTS, Primary Examiner

M. KASSENOFF, Assistant Examiner